(12) United States Patent
Gregori

(10) Patent No.: US 7,482,774 B2
(45) Date of Patent: Jan. 27, 2009

(54) SELF-HEALING PASSPOINT-FACILITATED METHOD AND APPARATUS

(75) Inventor: Eric Gregori, Lindenhurst, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 662 days.

(21) Appl. No.: 10/722,372

(22) Filed: Nov. 25, 2003

(65) Prior Publication Data

US 2005/0108944 A1 May 26, 2005

(51) Int. Cl.
*G05B 5/00* (2006.01)
(52) U.S. Cl. .................. 318/466; 318/266; 318/282
(58) Field of Classification Search .............. 318/466, 318/266, 282
See application file for complete search history.

(56) References Cited

U.S. PATENT DOCUMENTS

| | | | | |
|---|---|---|---|---|
| 5,136,809 A | * | 8/1992 | Richmond et al. ............. | 49/28 |
| 5,543,693 A | * | 8/1996 | Janca et al. .................. | 318/283 |
| 5,729,101 A | * | 3/1998 | Richmond et al. ........... | 318/282 |
| 5,969,637 A | * | 10/1999 | Doppelt et al. ......... | 340/825.69 |
| 5,998,950 A | * | 12/1999 | Fitzgibbon et al. .......... | 318/280 |
| 6,020,703 A | * | 2/2000 | Telmet ....................... | 318/480 |
| 6,326,751 B1 | * | 12/2001 | Mullet et al. ................ | 318/434 |
| 6,741,052 B2 | * | 5/2004 | Fitzgibbon .................. | 318/434 |
| 6,842,112 B2 | * | 1/2005 | Pulis et al. .................. | 340/524 |
| 2003/0201743 A1 | * | 10/2003 | Study et al. ................. | 318/466 |
| 2004/0064287 A1 | * | 4/2004 | Fitzgibbon .................. | 702/145 |

* cited by examiner

*Primary Examiner*—Walter Benson
*Assistant Examiner*—Antony M Paul
(74) *Attorney, Agent, or Firm*—Fitch, Even, Tabin & Flannery

(57) ABSTRACT

In a movable object system (10) that makes use of both a maintained count (31) that corresponds to movement of a given object and passpoint events (32) as generated by a corresponding passpoint signal generator (15), count zones (34, 37, 36A, 36B) can be defined for at least one of the passpoint events. Such count zones can be used to aid in determining when significant recalibration of the passpoint event/count value relationships should be undertaken. In a preferred embodiment, such count zones include no more than a single passpoint event.

39 Claims, 4 Drawing Sheets

SELF-HEALING PASSPOINT-FACILITATED METHOD AND APPARATUS

TECHNICAL FIELD

This invention relates generally to object movement facilitation and more particularly to passpoint-facilitated movement control.

BACKGROUND

Various objects are moved in an automated fashion. To ensure controlled movement of the object the relative position of the object must usually be known (at least during certain portions of the object's travel and trajectory). For example, when the object comprises a movable barrier that moves pursuant to the motive facilitation of a corresponding movable barrier operator, relative position of the movable barrier with respect to known obstacles (such as a floor, wall, or other fixed barrier) should be known in order to aid in ensuring that the automated mechanism does not mis-position the movable barrier with respect to such an obstacle and thereby potentially damage the movable barrier, the obstacle, and/or the movable barrier operator mechanism or other persons or property in the vicinity of the impact.

Various solutions are known in the art to facilitate knowing the present likely position of a moving object. One simple solution makes use of so-called limit switches. These are mechanically actuated switches that are usually placed in a fixed location of interest (such as near a desired end-of-travel location for the movable barrier). Such switches are closed when physically contacted by the movable barrier and can serve to signal a controller that the movable barrier has at least reached a position that corresponds to the location of the limit switch.

While suitable for many settings, there are some scenarios when such switches provide less than satisfactory service. This method of knowing the position does not readily facilitate automatic setup of the travel for the moving object. This, in turn, allows limits of travel to be set correctly or incorrectly as ordained by an installer. For example, when an installer sets the limits of travel he or she can set the stop position a long distance from the true end of travel.

Another prior art approach provides for the generation of signals that each correspond to a particular amount of travel for the object in question. For example, many movable barrier operators use magnetic or light sensitive sensors to detect rotation of a motor (or other motive linkage) that drives movement of a corresponding movable barrier. These pulses are then counted during a learning mode of operation to ascertain the number of pulses that are required to move the object from a first position to a second position. That count is then used during normal operation to measure and detect a present position of the moving object.

Again, unfortunately, such an approach, while providing satisfactory service in some circumstances, often leaves much to be desired. For example, when used with a movable barrier operator, such an approach is highly subject to slight shifts in the physical position compared to the count (due to missed or additional counts, or power loss while in travel). Such slight shifts can give rise to small errors that, over time, can accrue to a significant extent. Such an accrued error will, in turn, cause the movable barrier operator to mis-locate a present position of the movable barrier and again potentially permit or even cause an inappropriate attempted positioning of the movable barrier with respect to an obstacle such as a floor, wall, gate frame, or the like.

Passpoint-based schemes have been proposed to supplement such count-based approaches. Such systems typically provide for the generation of a passpoint event during ordinary travel of a corresponding object, such as a movable barrier, between two or more expected positions. This passpoint event can comprise, for example, a discrete light signal that is independent of the signals that are used to generate the above-described count and will usually be generated through an independent passpoint event generator that responds independently to some indicia of object movement. In theory, such a passpoint event can be utilized as a known fixed location as corresponds to movement of the moving object. Accordingly, the count can then be maintained as a function of that known fixed location to avoid the accrued error circumstances that can otherwise afflict such count-based systems.

Unfortunately, during initial installation the passpoint event has to be placed in the travel somewhere between the limits. This usually entails the passpoint being set to a specific position and the installer being required to install the unit in a specific location. If the installer does not accurately follow the installation procedure, the passpoint can be placed in a location that is not between the limits of travel. Under such circumstances, the movable barrier then has no passpoint event against which to calibrate its count or other position-determining processes.

To attempt to resolve such problems as these, other prior art suggestions provide for a plurality of passpoint events instead of only a single such event during any reasonable extent of movable barrier travel. So configured, at least one passpoint event will likely be detected during a learning sequence and thereby provide a basis for comparison to determine the accuracy of a present count and/or to re-calibrate the perceived position of the movable barrier with respect to the passpoint event. Again, however, such a solution has only begot yet other problems. In particular, it is possible for a movable barrier operator to become uncalibrated with respect to which passpoint event, of many detectable passpoint events, comprises the particular passpoint event against which location of the movable barrier can be firmly ascertained and measured.

BRIEF DESCRIPTION OF THE DRAWINGS

The above needs are at least partially met through provision of the self-healing passpoint-based apparatus and method described in the following detailed description. These and other benefits will become more evident upon making a thorough review and study of this detail description, particularly when considered in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, a movable barrier operator can comprise a movable barrier movement sensor and a counter and a passpoint event generator that is response to the latter. A movable barrier position determiner that is responsive to both the counter and the passpoint event generator is then preferably configured to effect a self-healing mode of operation that can facilitate proper passpoint usage even when, for example, an installation sequence for the movable barrier operator has not been properly followed. This capability can greatly ameliorate the sensitivity of such a system to the various deviations-from-the-norm that can and will happen during installation, automated or user-initiated learning, and/or usage of the system and thereby promote correct and safe usage with less potential need for outside assistance, instruction, or intervention.

Pursuant to a preferred approach, this self-healing can be facilitated through establishment and subsequent usage of one or more count zones. For example, during a learning mode of operation, a given passpoint event can be detected and then correlated with a particular count value. A count zone can then be defined that includes that given passpoint event and a portion, but not all, of the count as corresponds to movement of the object in question towards a given position. This approach can be used with systems that provide only a single passpoint event but will also readily serve in a multi-passpoint event setting. In particular, such a count zone can be established for only a single passpoint event amongst a plurality of passpoint events, or such count zones can be established and defined for multiple passpoint events (though not necessarily for all detected passpoint events). When multiple passpoint events exist and/or when multiple count zones are defined, preferably at least one passpoint event of interest will not share its particular count zone with any other passpoint event.

Figure 1:
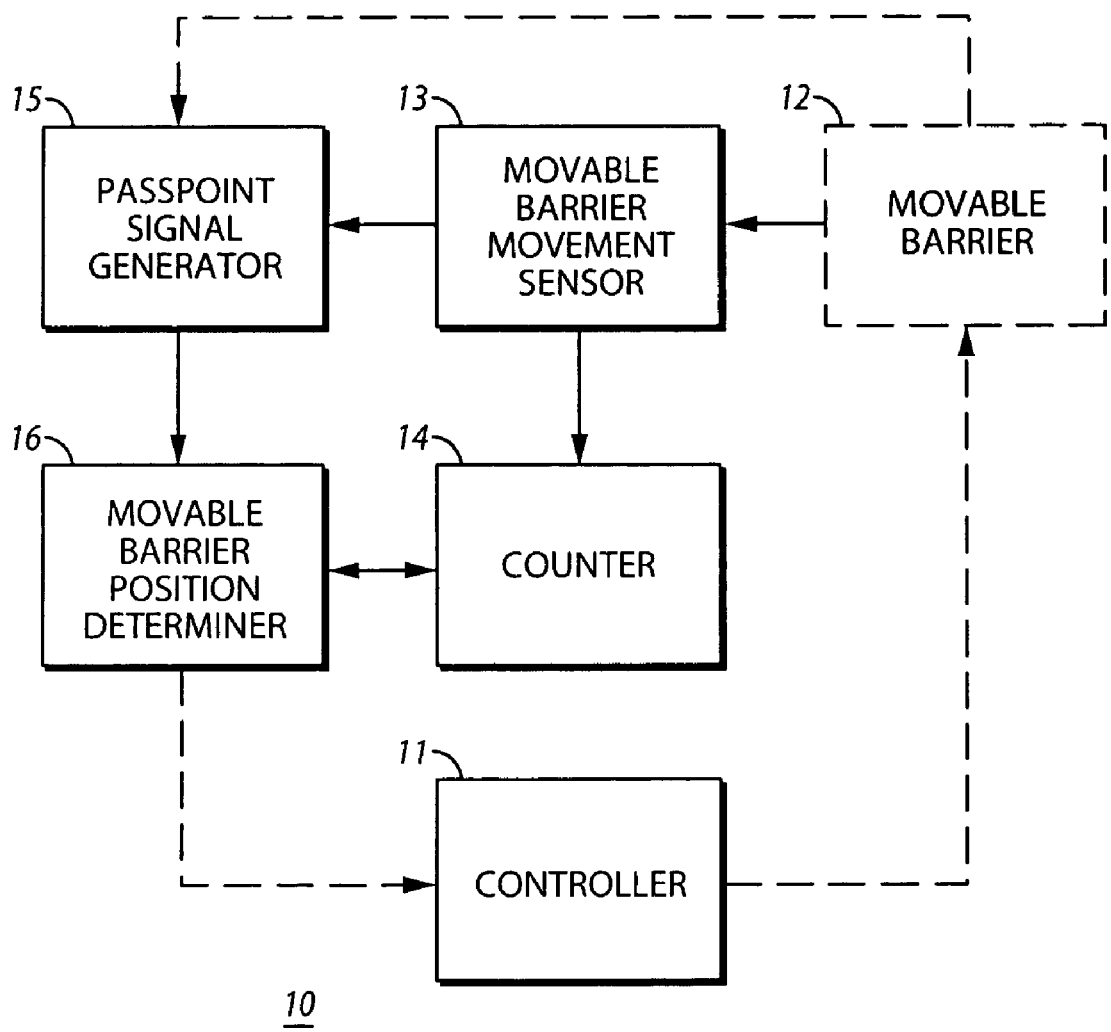
FIG. 1 comprises a block diagram as configured in accordance with various embodiments of the invention.

Referring now to FIG. 1, an illustrative and exemplary platform 10 for facilitating such a self-healing capability can be a movable barrier operator (such as the ubiquitous garage door opener or any other automated object movement mechanism). Such a platform 10 will typically comprise a controller 11 that effects controlled movement of a movable object such as a movable barrier 12 (including but not limited to vertically and horizontally moving barriers, pivoting barriers, rolling shutters, and the like). Such a controller 11 will often comprise a partially or fully programmable platform that can readily be programmed to comport with the teachings set forth herein with relative ease by those skilled in the art. In the alternative, these teachings can also be implemented through use of discrete dedicated-purpose platforms of various kinds. The precise architectural nature of such components are dependent more upon the other requirements a system designer may be seeking to accommodate and not so much to accord with these teachings. As such, a more detailed description of such known platforms is not necessary here and will not be offered for the sake of brevity and the preservation of focus.

Such an exemplary platform 10 will preferably comprise a movable barrier movement sensor 13, a counter 14, and a passpoint signal generator 15. Such components are all well known in the art. In general, a movable barrier movement sensor 13 serves to detect movement of a movable barrier (often by monitoring a phenomena that ordinarily reliably correlates to such movement). For example, a motor (not shown) often serves to cause selective movement of the movable barrier 12. The output of the motor can be monitored, directly or indirectly, in any of a variety of known ways to detect the motive output thereof. This motive output can in turn be used to generate a corresponding signal. For example, various magnetically-responsive or optically-based systems are available to sense the rotational output of a motor for such purposes. Other possibilities also exist, of course. For example, a linear sensor can be used in accordance with well-established prior art technique to provide a signal that similarly correlates to movement of the movable barrier 12.

The counter 14 typically serves to receive the signals as generated by the movable barrier movement sensor 13 and to process those signals in some fashion with respect to a count. For example, a count can be incremented upon receipt of each such signal (often such a count will first be initialized at, for example, a zero value prior to initiating such an incrementing count). As another example, a count can begin with a given predetermined value which then decrements upon receipt of each such signal. In any event, in a typical embodiment, this count, however initialized and however increased, decreased, or otherwise processed, serves to provide at least some measure of a present location of a movable barrier 12 during movement of that movable barrier 12.

The passpoint signal generator 15 can similarly be any known or hereafter-developed mechanism that provides such a signal. For example, in many optically-based movement sensor systems, an additional optically-based mechanism will be provided that issues a passpoint optical signal (to illustrate, a given system might generate a basic count signal for each 1.0 cm of movement by the movable barrier 12 and a passpoint signal for every 30.0 cm of movement).

All of the above-described components are well known in the art with many embodiments and variations being available and understood and with further improvements and equivalents no doubt to be expected. In addition, these teachings are generally compatible with at least most of these varied approaches. For the sake of brevity and to foster clarity, no additional elaboration regarding specific embodiments of such components will be provided here.

A preferred embodiment will also include a movable barrier position determiner 16. This component can comprise a discrete element as suggested by the illustration or can be incorporated with other functionality as desired. For example, the movable barrier position determiner 16 can be incorporated into the controller 11 and/or the counter 14 as may better suit the needs of some applications. In a preferred configuration the movable barrier position determiner 16 operably couples to both the counter 14 and the passpoint signal generator 15 and provides an output to the controller 11 (which output can comprise, for example, a corrected count). In general, the movable barrier position determiner 16 serves during a learning mode of operation to define one or more zones of count values and, during a normal mode of operation, to automatically process position information as corresponds to the movable barrier 12 (from, for example, the counter 14) as a function, at least in part, of a passpoint event that occurs during such a predetermined zone of count values. (Additional detail will be provided below regarding the defining of such zones of count values.) The movable barrier position determiner 16 therefore serves, at least in part, to facilitate a self-healing process when a disparity occurs with respect to the count on the one hand and a passpoint event on the other hand.

As noted earlier, the just-described platform embodiments are suitable to support the processes described herein. It will be understood by those skilled in the art, however, that other platforms may work as well or better depending upon the needs and requirements of a given setting and context. In general, these processes include both at least one learning mode of operation and at least one other mode of operation such as a normal mode of operation.

Figure 2:
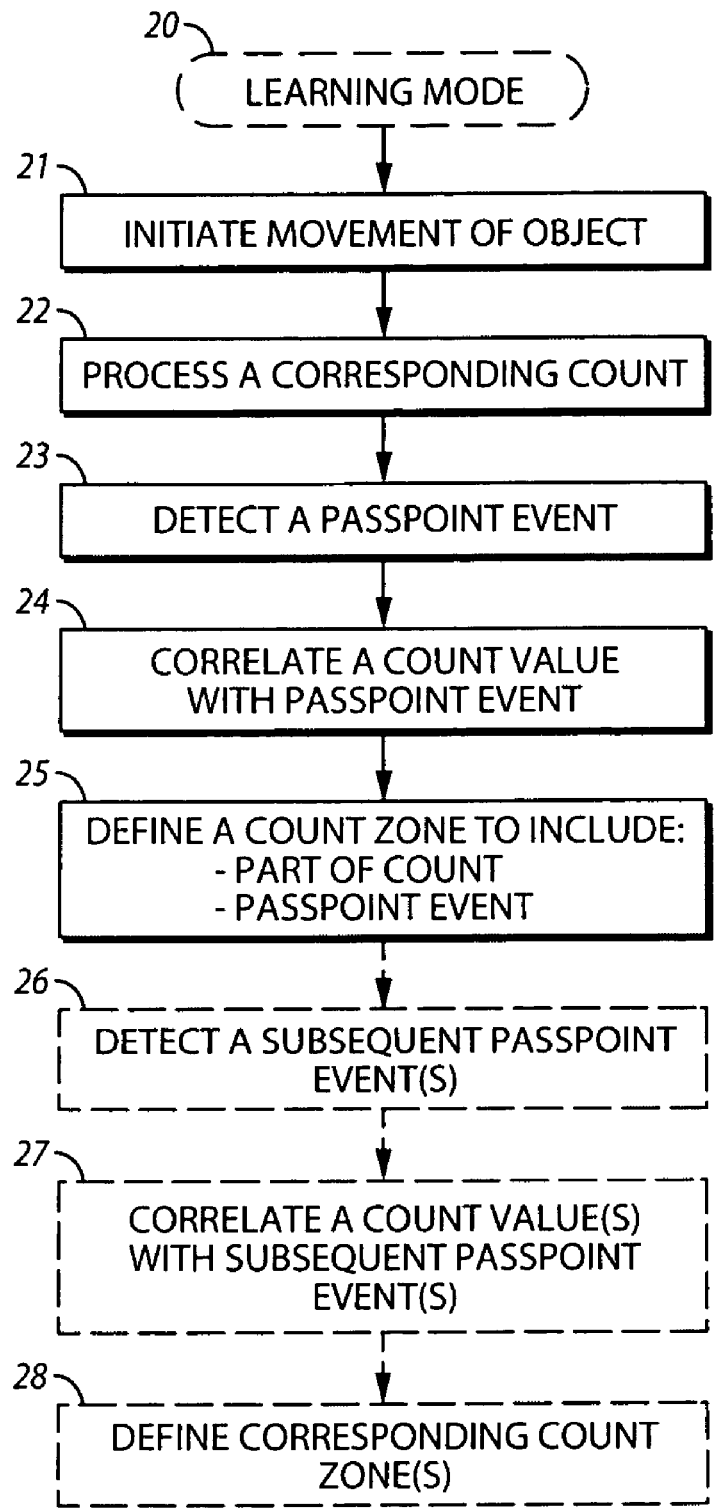
FIG. 2 comprises a flow diagram as configured in accordance with various embodiments of the invention.

Referring now to FIG. 2, various embodiments as pertain to a learning mode of operation 20 will first be presented. Such a learning mode of operation 20 can be initiated in a variety of ways as are generally well understood in the art. For example, a learning mode of operation can be selected and initiated automatically upon detecting some particular event (such as an initial powering up or detection of some indicia that normal operation may be presently ill-advised). Or, a learning mode of operation can be specifically selected by an installer or other operator upon asserting, for example, a learning mode selector as comprises a part of a user interface.

In a preferred embodiment the learning mode of operation 20 provides for initiating 21 (or otherwise operating in conjunction with) movement of a given object towards a given position (such as, for example, a movable barrier). As one illustration, a movable barrier in the fully closed position may begin moving towards a fully opened position (or vice versa). As the object moves the process 22 processes a corresponding count as a function, at least in part, of the movement of the object towards the given position. For example, when the system includes an optical signal that is sensed in a manner that correlates to movement of the object by a specific set distance, the process 22 can maintain an incrementing count of such optical signals.

As a more specific example, such optical signals may correspond to a count of revolutions (of a motor's output, for instance) that correspond to movement of the object. The count may preferably begin from an initialized zero and be serially incremented upon detection of each succeeding optical signal. As another illustrative example, the count can begin with some predetermined value that is then serially decremented upon detection of each succeeding optical signal. Other count-maintenance schemes are no doubt available and potentially suitable for use as well.

Figure 3:
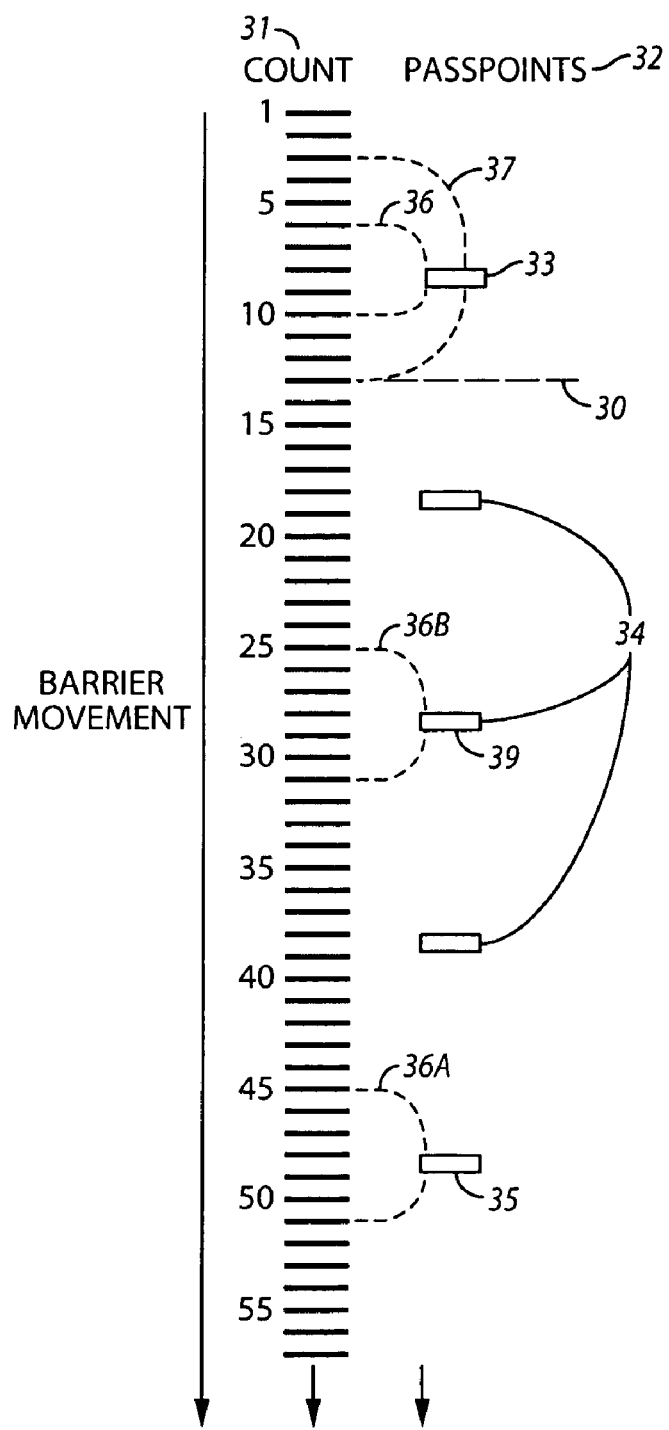
FIG. 3 comprises a timing diagram as configured in accordance with various embodiments of the invention.

With momentary reference to FIG. 3, and presuming a beginning initialized count value of zero, such a count 31 can increment to a count value of "1," and then "2," and so forth as the movable barrier moves towards the desired position and causes the optical signals to trigger in lock-step with the physical movement of the movable barrier. (In the illustration provided, a count value of "57" is shown as having been ultimately attained; it will be understood that such an example is for illustrative purposes only and that considerably fewer, or more, count signals (and hence a corresponding attained count value) can be utilized as desired.)

Referring again to FIG. 2, while processing this count, the process 23 also detects passpoint events as they occur. Depending upon the needs of a given application there may be only one such passpoint event to detect during movement of the object from its beginning position to its intended concluding position. Or, there may be two such passpoint events that are detected (and/or that are even potentially detectable). Or, there may be three or more such passpoint events. In general, such passpoint events will tend to be regularly spaced apart from one another (as measured by the intervening count) but this is not an essential requirement. It may also be appropriate in a given application, for example, to utilize more than one passpoint event generator. In such a case, the two (or more) generators may respond to movement of the object in differing ways. As a simple illustration, a first passpoint generator may generate a passpoint event every 10 cms while a second passpoint generator may generate a passpoint event every 15 cms of movement.

Upon detecting a passpoint event of interest, the process 24 correlates passpoint event with a particular count value. For example, in a preferred approach, the passpoint event is correlated with a value of the count that is substantially coincident in time to detection of the passpoint event. To illustrate, and referring momentarily to FIG. 3, a first detected passpoint event 33 can be correlated with a count value of "8" while a subsequent passpoint event 35 can be correlated with a count value of "48" (these count values being the count values that are closest in time to occurrence of the passpoint events themselves in this example).

Referring again to FIG. 2, for a given passpoint event of interest, the process 20 then defines 25 a corresponding count zone that includes the passpoint event of interest and that also includes a portion, but not all, of the total count as corresponds to movement of the object towards the predetermined position. With momentary reference again to FIG. 3, for a given passpoint event 33 of interest, this count zone can comprise only a few counts (such as a first count zone 36 that includes only five sequential count values in this illustration) or a greater number of counts (such as a second count zone 37 that includes eleven sequential count values in this illustration.

In general the number of count values used to define a given count zone should be enough to offer some reasonable likelihood that the corresponding passpoint event will likely occur during the defined count zone notwithstanding uncalibration of the count versus the passpoint event for a variety of reasons. In a preferred embodiment, a given count zone will not extend so far as to include another passpoint event and will ordinarily extend no further than halfway to a next adjacent passpoint event. For example, as illustrated, a count zone that includes the first passpoint event 33 to occur during movement of the object towards the new position will not extend further than the halfway point 38 to the next subsequent occurrence of a next passpoint event.

When only one passpoint event occurs (or can occur), defining a single count zone will of course suffice. For applications that provide more than one passpoint event but where only a single passpoint event will be used for count calibration purposes, a given system can be designed to select whichever passpoint event may appear best suited for this purpose. This may be a first detected passpoint event, a second detected passpoint event, a last detected passpoint event, and so forth. It is also possible, however, to use more than a single passpoint event for count calibration purposes when more than one passpoint event is otherwise available.

When expecting more than one possible passpoint event, and referring again to FIG. 2, the process 20 can optionally monitor for and detect 26 passpoint events that are subsequent to a first passpoint event. To illustrate (and again making momentary reference to FIG. 3), a number of passpoint events 34 may occur subsequently to a first detected passpoint event 33. In a preferred approach, for any of these subsequent passpoint events that will or may serve as a calibration opportunity with respect to the count 31, the process 20 (FIG. 2) can again correlate 27 such subsequent passpoint event or events with a corresponding count value. And again, the process 20 can then define 28 a count zone to correspond to such passpoint events (where again the count zones will preferably include that particular subsequent passpoint event along with some less-than-all portion of the full count). For example, as illustrated in FIG. 3, one 39 of the intermediary subsequent passpoint events 34 has been identified as being of at least potential use in count calibration and has a correspond count value (in particular, a count value of "28" in this illustrative example) and a corresponding count zone 36B.

When a plurality of passpoint events are available, one of the passpoint events will of course comprise a last detected passpoint event. Using these same define 25, correlate 27, and define 28 actions the process 20 can also detect such a concluding passpoint event 35 (see FIG. 3), correlate that concluding passpoint event 35 with a corresponding count value (such as a count value of "48" in the illustrative example of FIG. 3), and define a corresponding count zone 36A for that concluding passpoint event 35.

In general, it can be seen that such a learning mode process 20 can detect at least one additional passpoint event as corresponds to movement of a movable object and correlate a value of a count with at least one of such additional passpoint events. One or more count zones can then be defined to include a portion, but not all, of the count as corresponds to movement of the object towards a position and the selected additional passpoint events.

So configured, it will be appreciated that one or more passpoint events can have a corresponding count value and count zone associated therewith. Depending upon the calibration strategy to be effected, the particular passpoint event or events to have such count zones can comprise a first detected passpoint event, a last detected passpoint event, and/or one or more intervening passpoint events. In general, such count zones will only comprise a portion of the complete available count and preferably will only include a single passpoint event. As a corollary observation, it will be appreciated that such a strategy can also include not defining a count zone to include a given passpoint event. For example, it may be desirable to define a count zone for a first passpoint event and for every other detected passpoint event but not to define a count zone for intervening passpoint events.

Such a learning mode of operation can be effected once during, for example, installation of a given system or, if desired, can be cycled through multiple iterations (to compare and contrast successive results, for example, to potentially ensure the veracity of the learning mode results). As will be shown below, it is also possible to effect such a learning mode of operation at other times as well. For example, it may be appropriate to initiate such a learning mode when a determination occurs during a normal mode of operation that the learning mode should be redone.

Figure 4:
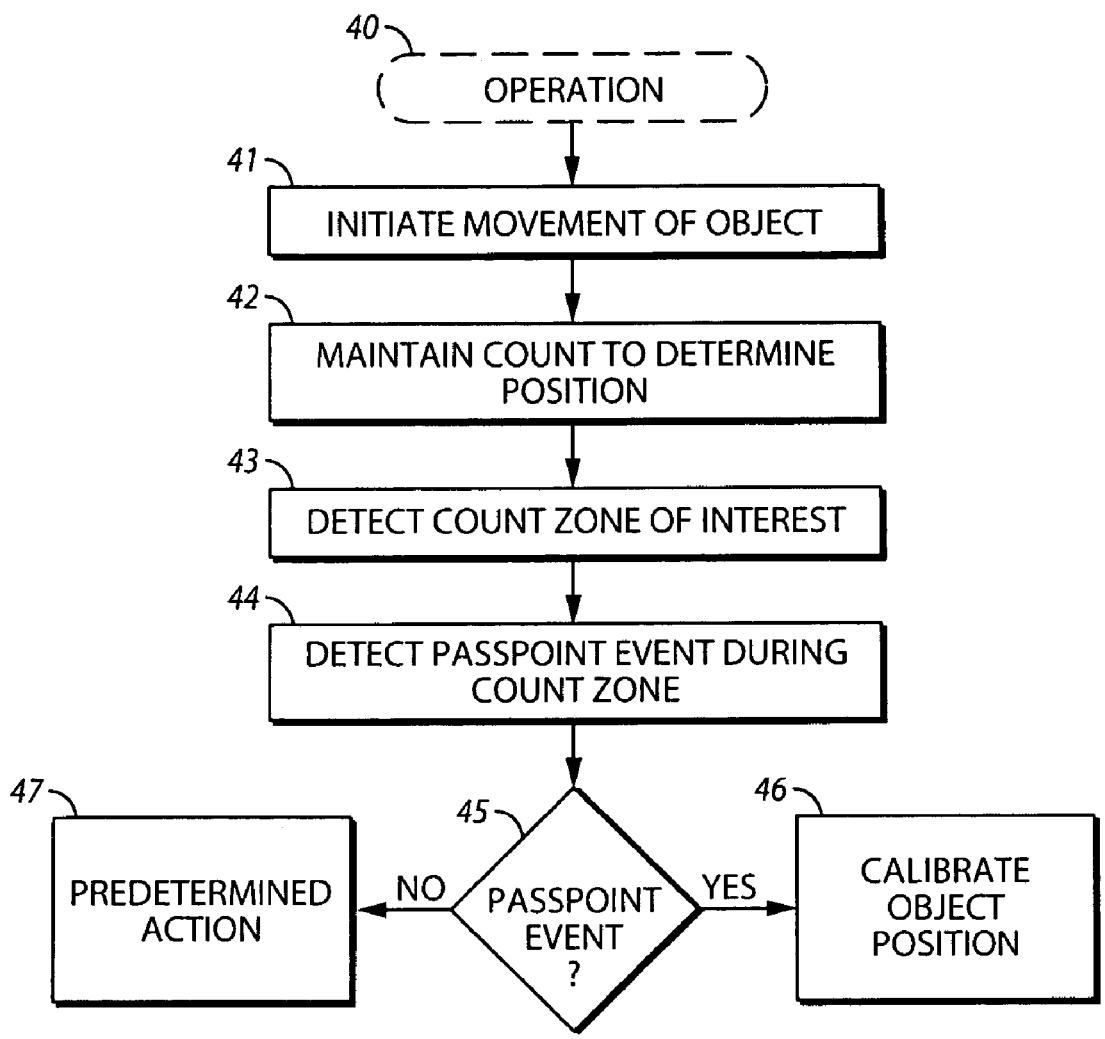
FIG. 4 comprises a flow diagram as configured in accordance with various embodiments of the invention.

Referring now to FIG. 4, a normal mode of operation 40 can then make use of the results of the learning mode of operation to aid in ensuring the accuracy of calculations that serve to determine a present position of the movable object. In a preferred embodiment, upon initiation 41 of movement of the object in question, a count as earlier described is maintained 42 to facilitate determination of the object's position. This count serves in part to facilitate detection 43 of a count zone of interest.

For example, if a first count zone of interest has been defined to begin at a count value of "3," then upon determining that the count value now equals "3" the beginning of the count zone is noted. The operation 40 then detects 44 a passpoint event and determines 45 whether that passpoint event occurs during that count zone. Upon detecting such a passpoint event during the count zone, the operation 40 then uses 46 that information to determine, for example, whether that passpoint event occurred at an expected count value as was previously correlated to that passpoint value. For example, if that passpoint value for that count zone has a previously correlated count value of "8," and if the operation 40 detected this passpoint value when the present count value equaled "8," then the operation 40 can determine that no calibration is presently required. That is, the passpoint event occurred at an expected value of the count. More particularly, pursuant to these embodiments, the operation 40 has assurance that the detected passpoint event in fact comprises the correct expected passpoint event because the count zone has limited the window of opportunity for inclusion of a wrong passpoint event.

To continue this example, if the detected passpoint event has a corresponding presently detected count value of "9" rather than "8," then the operation 40 can determine that the count has become uncalibrated with respect to movement of the movable object. In response, the operation 40 can, for example, initiate an action (or at some appropriate subsequent time) (correlate) the object's position with respect to the passpoint event(s).

There are a variety of ways that such calibration can be effected. Pursuant to one embodiment, the current count can be modified. For example, the current count value can be modified to be "8" rather than "9" so that the current count becomes again synchronized with the previously established set of passpoint value/count value relationships. Pursuant to another embodiment, the previously established set of relationships can be modified. For example, the set of relationships can be modified so that this passpoint event is now expected to occur at a count value of "9" rather than a count value of "8." Pursuant to yet another embodiment, when the movable barrier system includes, for example, an appropriate clutch mechanism, the actual physical location of the movable barrier itself can be modified and adjusted to return the position of the movable barrier to a position that correlates with the specifications of the previously determined passpoint event/count value relationships.

It is possible, of course, that no passpoint event may be detected 45 during a given count zone. Such an event will often indicate that a potentially more serious instance of uncalibration has occurred. In such an instance the operation 40 can effect some predetermined action 47. For example, the operation 40 can immediately effect or subsequently schedule a learning mode of operation. This will permit the system to, for example, automatically use the above described learning mode of operation to again detect available passpoint events and correlate their corresponding count values and define their respective count zones as per the position determination methodology of choice.

These various ways of permitting a movable object system to use one or more passpoint events to calibrate a determined position of the object in conjunction with corresponding count zones serve to permit both reliable use of such passpoint events for this purpose while also permitting a self-healing response when a given expected passpoint event occurs in a manner that is beyond a measure of variance that comports with using that passpoint as a basis for recalibration. That is, a certain degree of variance between passpoint events and pre-determined count values can be readily tolerated and used as a triggering mechanism to permit mild recalibration to ensure that a present position of a movable object is accurately ascertained. Similarly, a degree of variance that places an anticipated passpoint event outside the ambit of its count zone can be used as a triggering mechanism to permit a more substantive recalibration mechanism to re-establish and realign the passpoint event or events with accurately correlated count values.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. For example, when multiple passpoint event generators are used, it may be desirable to process the count independently with respect to the passpoint events of each passpoint event generator. Such a configuration may yield an increased degree of confidence in the count that suits the requirements of certain applications.

I claim:

1. A movable barrier operator comprising:
   a movable barrier movement sensor configured to sense movement of a barrier and effect signals which reflect movement of the barrier upstream and downstream;
   a counter that is responsive to the signals effected by the barrier movement sensor to provide a corresponding count having a plurality of count values which indicate a position of a barrier;
   at least one passpoint signal generator which effects at least one passpoint event from at least one fixed reference point between an open and closed position of the barrier and defines a location of at least one count zone defined by count values which are intermediate the full range of movement of the barrier and which count values are both upstream and downstream of the fixed reference point;
   a movable barrier position determiner that is responsive to the counter and the passpoint signal generator and which correlates the count of the counter with the passpoint event as the counter counts signals which reflect movement and the position of the barrier through the count zone, a count value being recalibrated from a passpoint event between the open and closed position of the barrier when an anticipated passpoint event between the open and closed position of the barrier does not correlate with a count value in the count zone as the barrier moves past the passpoint reference point between the open and closed position of the barrier such that a position of the barrier is indicated relative to a reference point that is intermediate the full range of travel of the barrier.

2. The movable barrier operator of claim 1 wherein the movable barrier movement sensor comprises a rotational sensor.

3. The movable barrier operator of claim 1 wherein the movable barrier movement sensor comprises a linear sensor.

4. The movable barrier operator of claim 1 wherein the the count zone includes a number of count values in the count zone.

5. The movable barrier operator of claim 4 wherein the barrier operator further comprises an additional passpoint signal generator at a second fixed reference point between the open and closed position of the barrier and which passpoint signal generator effects a second passpoint event intermediate the full range of movement of the barrier between the open and closed position of the barrier from the second fixed reference point which second passpoint generator defines a location of at least one additional count zone of count values between the open and closed position of the barrier.

6. A method comprising:
   initiating movement of an object between an open end point and a closed end point towards a position;
   processing a count as a function, at least in part, of the movement of the object towards the position;
   detecting a first passpoint event between the open end point and the closed end point, the first passpoint event being at a fixed reference point between the open end point and the closed end point, the passpoint event defining a location of a count zone defined by count values which indicate a position of the object and which count values are intermediate the full range of travel of the object and which count zone is both upstream and downstream the fixed reference point;
   correlating a first value of the count with the first passpoint event which is intermediate the full range of travel of the object; and
   recalibrating count values when an anticipated passpoint event does not correlate with a count value in the count zone as the object moves past the fixed reference point in the count zone such that the position of the object is indicated relative to a reference point which is intermediate the full range of travel of the object.

7. The method of claim 6 wherein the first passpoint event is one of multiple passpoint events which define the locations of count zones through which the object passes.

8. The method of claim 6 wherein initiating movement of an object comprises initiating movement of a movable barrier.

9. The method of claim 8 wherein initiating movement of an object towards a position comprises initiating movement of the movable barrier towards one of:
   an open position; and
   a closed position.

10. The method of claim 6 wherein processing a count comprises processing a count of revolutions that correspond to movement of the object.

11. The method of claim 6 wherein processing a count comprises at least one of:
    incrementing a count; and
    decrementing a count.

12. The method of claim 6 wherein correlating a first value of the count with the first passpoint event comprises correlating a value of the count that is substantially coincident in time to detection of the passpoint event with the first passpoint event.

13. The method of claim 6 wherein defining a location of a first count zone further comprises defining the first count zone to not include another passpoint event.

14. The method of claim 13 wherein defining a location of a first count zone further comprises locating the first count zone to extend no further than halfway to a next adjacent passpoint event.

15. The method of claim 6 and further comprising:
    detecting a subsequent passpoint event;
    correlating a subsequent value of the count with the subsequent passpoint event;
    defining a location subsequent count zone to include:
      a portion, but not all, of the count as corresponds to movement of the object towards the position; and
      the subsequent passpoint event.

16. The method of claim 15 wherein defining a location of a subsequent count zone further comprises locating the subsequent count zone to not include the first passpoint event.

17. The method of claim 16 wherein defining a subsequent count zone further comprises defining the location of the subsequent count zone to not overlap with the first count zone.

18. The method of claim 6 and further comprising:
    detecting a first subsequent passpoint event;
    detecting a last passpoint event that is subsequent to the first subsequent passpoint event;
    locating a last count zone to include:
      a portion, but not all, of the count as corresponds to movement of the object towards the position; and
      the last passpoint event.

19. The method of claim 18 and further comprising locating an intervening count zone to include:
a portion, but not all, of the count as corresponds to movement of the object towards the position; and
the first subsequent passpoint event.

20. The method of claim 19 wherein no portion of the first count zone, the last count zone, and the intervening count zone overlap with one another.

21. A method comprising:
initiating movement of an object which moves upstream and downstream towards a position;
processing a count as a function, at least in part, of the movement of the object towards the position;
detecting a first passpoint event, the first passpoint event being at a first fixed reference point, the first passpoint event defining a location of a first count zone having a plurality of count values both upstream and downstream the first fixed reference point and which count values indicate a position of the object;
correlating a first value of the count with the first passpoint event as the object moves past the first fixed reference point;
detecting a first subsequent passpoint event, the first subsequent passpoint event being at a second fixed reference point and defining a location of a second count zone having a plurality of count values both upstream and downstream the second fixed reference point and which count values indicate a position of the object;
correlating a first subsequent count value with the first subsequent passpoint event as the object moves past the second fixed reference point;
detecting a last passpoint event that is subsequent to the first subsequent passpoint event, the last passpoint event being at a third fixed reference point and defining a location of a last count zone having a plurality of count values both upstream and downstream the last fixed reference point and which count values indicate a position of the object;
correlating a last value count value with the last passpoint event as the object moves past the last fixed reference; and
recalibrating a signal count value when an anticipated passpoint event does not correlate with a count value in any of the count zones as the object moves past any one of the fixed reference points such that the position of the object is indicated relative to a reference point that is intermediate the full range of travel of the barrier.

22. The method of claim 21 and further comprising:
recalibrating a signal count value and a determined position for the object with respect to a passpoint event that occurs during at least one of the first count zone and the last count zone.

23. The method of claim 22 wherein subsequently calibrating a determined position further comprises not calibrating a determined position for the object with respect to a passpoint event that does not occur during the first count zone.

24. The method of claim 22 and further comprising taking a first predetermined action when a passpoint event does not occur during one of the count zones.

25. The method of claim 24 wherein taking a first predetermined action includes automatically initiating a learning mode of operation.

26. A method for use with a movable barrier operator which moves a movable barrier in an upstream and downstream direction between an open and closed position of the barrier, the method comprising:

during a learning mode of operation:
initiating movement of the movable barrier towards the open or closed a position;
maintaining a count of a plurality of count values which indicate the movement and the position of the movable barrier;
detecting a first passpoint event that is at a fixed reference point and corresponds to a location of the movable barrier;
correlating a first value of the count in at least a first count zone with the first passpoint event;
locating the at least first count zone which is intermediate to the open and closed position and full range of travel of the barrier and which first count zone includes:
a portion, but not all, of the count as corresponds to movement and position of the barrier towards a position through the count zone past the first passpoint event;
during a first mode of operation:
maintaining a current count of count values that corresponds to movement and position of the movable barrier;
detecting the first count zone; and
recalibrating a count value when an anticipated passpoint event does not correlate with a count value in the at least one of the count zones as the barrier moves past the passpoint in the count zone to calibrate a position of the movable barrier.

27. The method of claim 26 wherein maintaining a count comprises first initializing the count.

28. The method of claim 26 wherein defining a first count zone further comprises locating the first count zone to not include another passpoint event.

29. The method of claim 26 wherein the first mode of operation comprises a normal mode of operation.

30. The method of claim 26 wherein the recalibration of a count value comprises modifying the current count.

31. The method of claim 26 wherein recalibration occurs during the first count zone to facilitate calibration of position determination for the movable barrier and the recalibration comprises modifying the first value of the count that is correlated with the first passpoint event.

32. The method of claim 31 wherein the recalibration occurs during the first count zone to facilitate calibration of a position determination for the movable barrier comprises and the recalibration includes modifying a physical location of the movable barrier as corresponds to the first passpoint event.

33. The method of claim 26 and further comprising:
during the learning mode of operation:
detecting at least one additional passpoint event that corresponds to movement of the movable barrier;
correlating a value of the count in an additional count zone associated with at least one additional passpoint event;
locating additional count zone to include:
a portion, but not all, of the count as corresponds to movement of the object towards the position; and
the additional passpoint event.

34. The method of claim 33 wherein defining additional count zone further comprises locating the additional count zone to not include another passpoint event.

35. The method of claim 33 and further comprising:
during the first mode of operation:
    detecting the additional count zone;
    using a passpoint event as occurs during the additional count zone to facilitate calibration of a position determination for the movable barrier.

36. A movable barrier controller comprising:
a movable barrier movement sensor input;
a counter that is responsive to indicia of movable barrier movement as received via the movable barrier movement sensor input;
a plurality of passpoint signal generators that are responsive to indicia of movement of the movable barrier which effect passpoint events from fixed reference points and define locations of count zones between an open and closed position of a movable barrier, the count zones being defined by count values which are intermediate the full range of movement of the barrier, the count zones having count values which indicate a position of a movable barrier and which count values correspond to a position of the movable barrier intermediate its full range of movement, the count zones having count values both upstream and downstream the fixed reference point; and
a position determiner which is responsive to the counter and the passpoint signal generators and which determiner processes position information of the movable barrier as a function of a passpoint event that occurs in the count zone as the barrier moves through a count zone such that a position of the barrier is indicated relative to a reference point that is intermediate the full range of travel of the barrier.

37. The movable barrier controller of claim 36 wherein the count zones include a plurality of consecutive count events.

38. The movable barrier controller of claim 36 wherein a count zone includes only a single passpoint event.

39. The movable barrier controller of claim 36 wherein the passpoint signal generators generate a plurality of passpoint events during movement of the movable barrier.

* * * * *

UNITED STATES PATENT AND TRADEMARK OFFICE
CERTIFICATE OF CORRECTION

PATENT NO. : 7,482,774 B2  Page 1 of 1
APPLICATION NO. : 10/722372
DATED : January 27, 2009
INVENTOR(S) : Eric Gregori It is certified that error appears in the above-identified patent and that said Letters Patent is hereby corrected as shown below:

Claim 4, Column 9, Line 44 -- Change "the the" to -- the --; and

Claim 26, Column 12, Line 3 -- After "closed" delete "a".

Signed and Sealed this

Eighteenth Day of May, 2010

David J. Kappos
*Director of the United States Patent and Trademark Office*